United States Patent [19]

Booker

[11] 4,106,436
[45] Aug. 15, 1978

[54] APPARATUS FOR DISPENSING A COATING OF LIQUID ON AN ELEVATED CABLE OR THE LIKE

[76] Inventor: Leslie L. Booker, 1504 Old Mill Rd., Moore, Okla. 73160

[21] Appl. No.: 717,982

[22] Filed: Aug. 26, 1976

[51] Int. Cl.² .............................................. B05C 5/02
[52] U.S. Cl. .................................... 118/307; 118/421
[58] Field of Search ............... 118/307, 208, 421, 323, 118/4, 7; 184/3, 15 R

[56] References Cited

U.S. PATENT DOCUMENTS

| 2,264,048 | 11/1941 | McMahon et al. | 118/307 |
| 2,858,555 | 11/1958 | Medovick | 118/208 X |
| 3,662,707 | 5/1972 | Dreve | 118/307 X |

*Primary Examiner*—Louis K. Rimrodt
*Attorney, Agent, or Firm*—Robert M. Hessin

[57] ABSTRACT

A self-propelled apparatus for uniformly dispensing a liquid insulated coating material on a telephone cable or the like adapted to be supported on and traversed over an elevated supporting cable to which the coaxial cable is secured. The apparatus includes a gasoline engine as a primary power source drivingly connected to a positive displacement hydraulic pump which provides pressurized liquid coating material to both a reversible hydraulic drive motor and a spray head. A hydraulic control system is disclosed for adjusting and controlling the operation of the apparatus. Manual spray means is further provided to facilitate the dispensing of liquid coating material on the cable.

18 Claims, 8 Drawing Figures

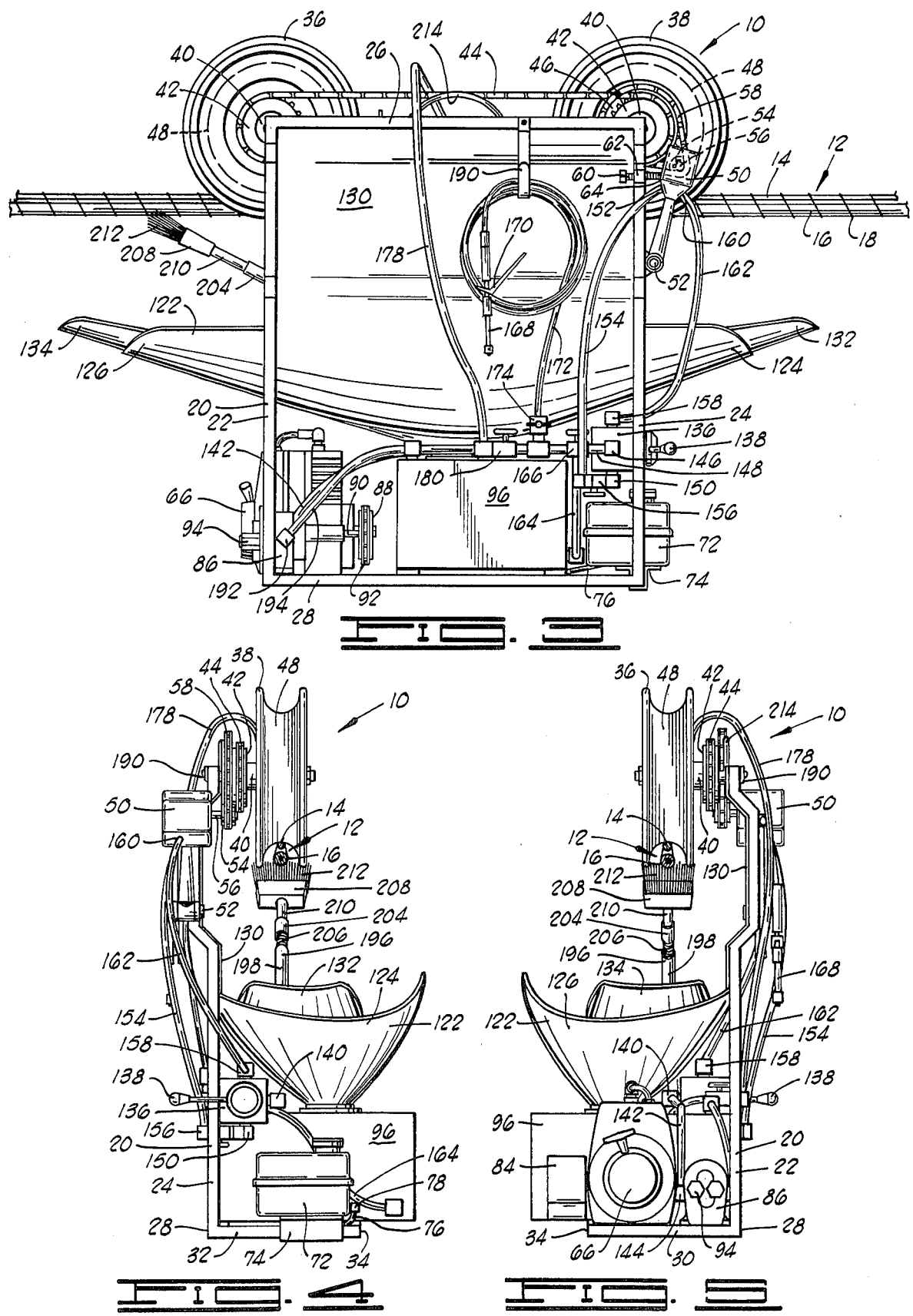

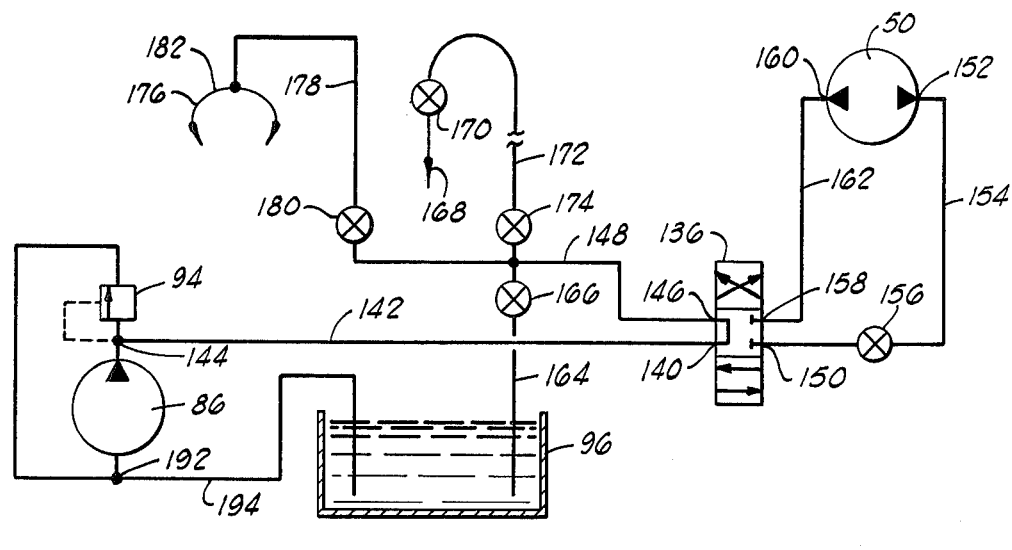
FIG. 6
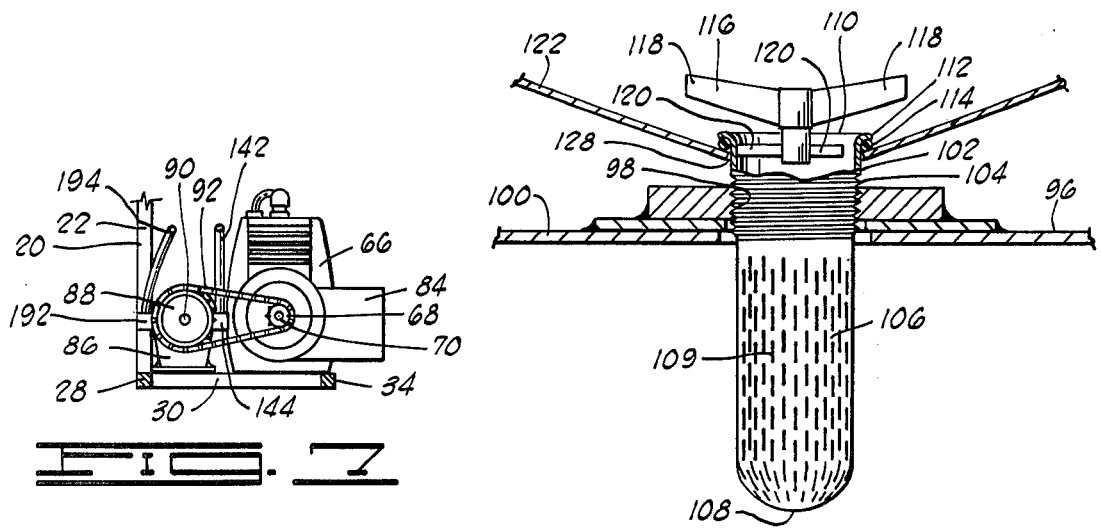
FIG. 7
FIG. 8

APPARATUS FOR DISPENSING A COATING OF LIQUID ON AN ELEVATED CABLE OR THE LIKE

BACKGROUND OF THE INVENTION

1. Field of the Invention

This invention relates generally to improvement in the coating of cables, and more particularly, but not by way of limitation, to an improved apparatus for applying a liquid coating material to the exterior of an electrical coaxial cable or the like.

2. Description of the Prior Art

In the telephone industry it has become commonplace to periodically apply a liquid coating material to the exterior of old telephone cables to maintain or improve the water resistant insulation characteristics of these cables. Conventional telephone coaxial cables are sheathed with lead to provide protection for the individual electrical conductors disposed therein. Through long periods of exposure to the elements and through the attack by squirrels, the lead sheathing often is afflicted with cracks or holes therein which permits the entrance of moisture into the coaxial cable which, in turn, causes shorting among the individual electrical conductors therein. Microscopic cracks form in the lead sheathing through prolonged exposure of the cable to the elements. Much larger holes in the lead sheathing can be attributed to the knawing of squirrels on the lead sheathing.

In view of this deterioration that appears in the lead sheathing of telephone cables, it has become economically feasible to periodically apply an insulating coating to the exterior of such cables rather than to replace cables with newer, better insulated cables. One such technique which has gained widespread approval embodies the application of a liquid coating material called "Insalite" which is manufactured and sold by Winton Products Co., Inc. of Charlotte, North Carolina. Various techniques have been employed to apply this liquid coating material to the exterior of telephone cables. Most obviously, hand application has been employed to a limited degree in areas where it would be most disadvantageous for the liquid coating material to fall on structures or foliage adjacent the work site. Another technique embodies the manual application of the liquid coating material by means of a roller sprayer having two or more spray nozzles which can be manipulated and propelled manually from the ground to traverse along the cable by means of a conventional utility stick. Pressurized liquid coating material is provided to the spray head through a conduit connected to a pressure tank on the operator's back at the ground level. More recently, an engine-powered pump has been utilized on the ground to provide pressurized liquid coating material to the spray head being manipulated along the cable.

In contrast, the apparatus of the present invention overcomes all the disadvantages of the prior art apparatus and techniques and permits the economical, uniform and neat application of liquid coating material to the exterior of telephone cables or other elevated cables without manual manipulation and propulsion of the apparatus during traverses along the cable.

The present invention contemplates an apparatus for dispensing a coating of liquid on a telephone cable or the like supported above the ground which apparatus includes a frame, and support means carried on the frame for supporting the apparatus on a cable for movement of the apparatus therealong. The apparatus further includes liquid supply means carried by the frame for providing a quantity of liquid under elevated pressure, and nozzle means carried by the frame and communicating with the liquid supply means for receiving liquid therefrom and directing liquid onto a cable. The apparatus also includes drive means carried by the frame and operatively connected to the support means for propelling the apparatus along the cable upon which it is supported.

An advantage of the invention is the provision of the apparatus which provides increased efficiency in the maintaining of telephone cables or the like.

Another advantage of the present invention resides in the provision of a self-propelled apparatus for dispensing a coating of liquid on a telephone cable or the like supported above the ground which is unaffected by terrain features beneath the cable.

A further advantage of the present invention resides in the provision of an apparatus which minimizes the possibility of overspraying liquid coating material onto adjacent foliage and structures during the coating of a length of telephone cable or the like.

A still further advantage of the present invention resides in the provision of an apparatus for dispensing coating liquid on a telephone cable or the like supported above the ground which employs the liquid coating material as the hydraulic fluid in the drive mechanism of the apparatus.

A yet further advantage of the present invention resides in the provision of apparatus for uniformly dispensing a coating of liquid on a telephone cable or the like supported above the ground which is light in weight, economical in construction and operation, and simple to operate and maintain.

Further objects and advantages of the present invention will be evident from the following detailed description when read in conjunction with the accompanying drawings.

BRIEF DESCRIPTION OF THE DRAWINGS

FIG. 3 is a rear side elevation view of the apparatus of FIG. 1.

FIG. 4 is a left end elevation view of the apparatus of FIG. 1.

FIG. 5 is a right end elevation view of the apparatus of FIG. 1.

FIG. 6 is a schematic diagram of the hydraulic system of the present invention.

FIG. 7 is a partial cross-sectional view taken along line 7—7 of FIG. 1.

FIG. 8 is an enlarged partial cross-sectional view taken along line 8—8 of FIG. 2.

DESCRIPTION OF A PREFERRED EMBODIMENT

Figure 1:
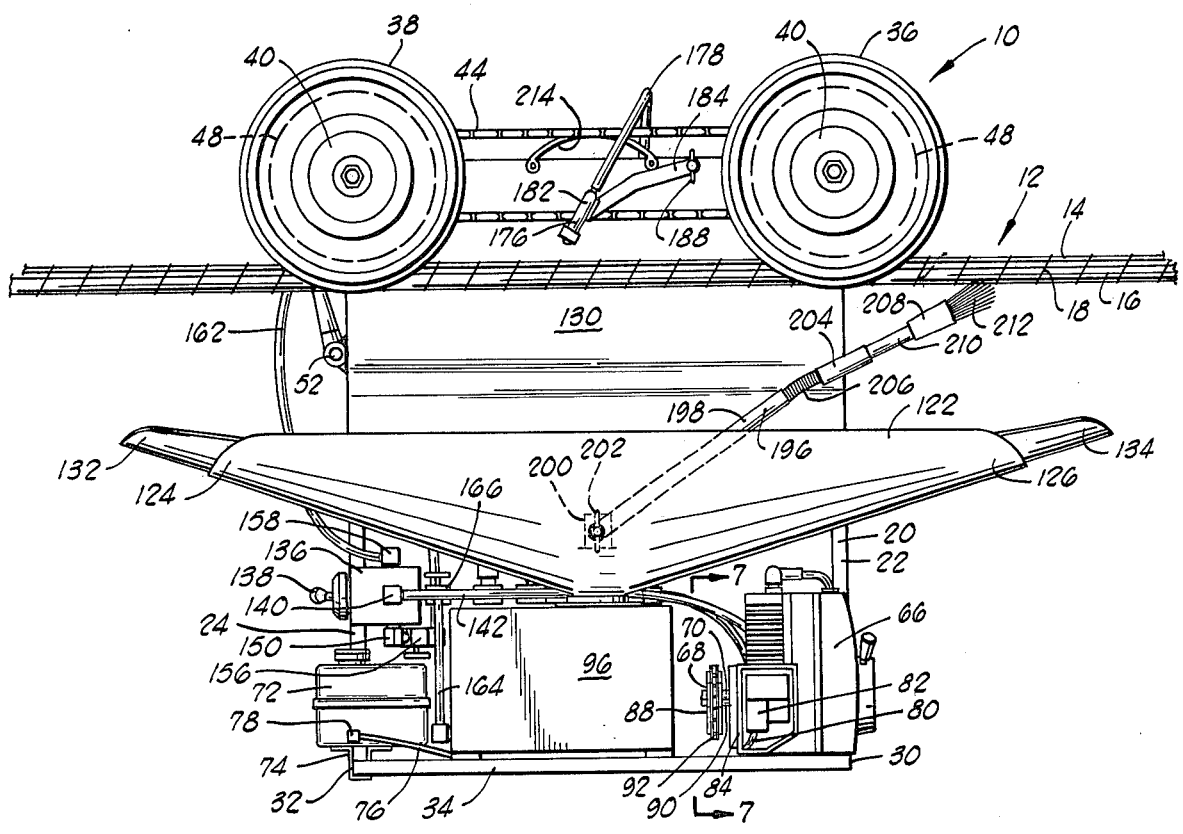
FIG. 1 is a front side elevation view of an apparatus for dispensing a coating of liquid on an elevated cable or the like constructed in accordance with the present invention and shown supported on a cable assembly to be coated.
Figure 2:
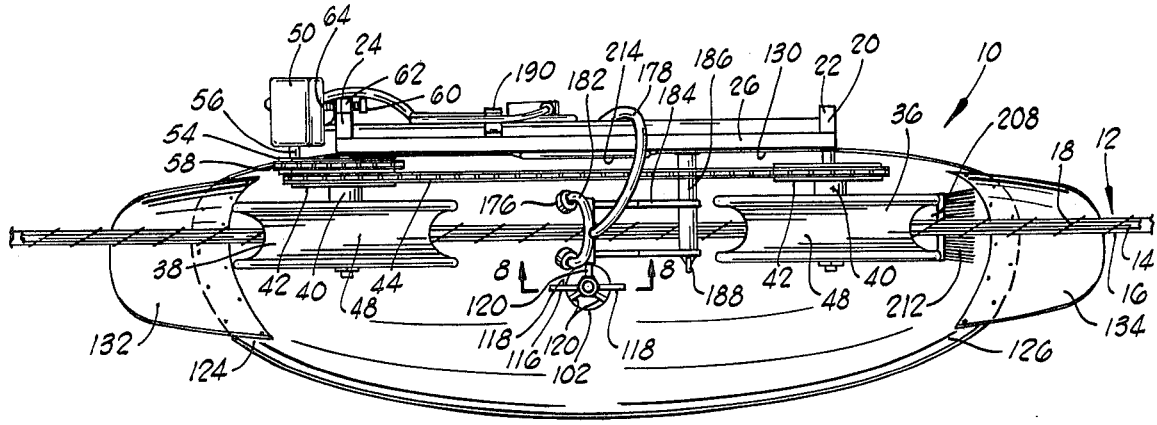
FIG. 2 is a top plan view of the apparatus of FIG. 1.

Referring now to the drawings, an apparatus for dispensing a coating of liquid on a telephone cable or the like in accordance with the present invention is generally designated by the reference character 10. The apparatus 10 is illustrated in FIGS. 1-5 suspended on a cable assembly 12. The cable assembly 12 typically comprises a supporting cable 14, a sheathed insulated coaxial cable 16, typically carrying a plurality of individual electrical conductors, and means 18 for mutually engaging the support cable 14 and the coaxial cable 16 in parallel relation along their length. Such means may suitably comprise one or more spirally wrapped wires mutually encompassing the supporting cable 14 and the coaxial cable 16, or a plurality of longitudinally spaced hanger members, each suitably formed of wire or other suitable material, supporting the coaxial cable 16 beneath the supporting cable 14.

The apparatus 10 comprises a rigid frame 20 comprising a pair of horizontally spaced vertical members 22 and 24 interconnected by a horizontally aligned top member 26 and a horizontally aligned bottom member 28. The frame 20 further includes a pair of horizontally extending members 30 and 32 extending respectively from the vertical member 22 and the vertical member 24 at their junctures with the bottom member 28. A second bottom member 34 interconnects the outer ends of the horizontally extending members 30 and 32 and is positioned in parallel alignment with the bottom member 28. The various members of the frame 20 may be suitably constructed of $\frac{1}{2}$ inch to $\frac{3}{4}$ inch square steel tubing with the various members mutually interconnected by welding.

A pair of wheels 36 and 38 are journaled on the frame 20 about mutually parallel, horizontal axes. The axis of the wheel 36 preferably intersects the frame 20 at the juncture between the vertical member 22 and the top member 26 while the axis of the wheel 38 preferably intersects the frame 20 at the juncture between the vertical member 24 at the top member 26. The wheels 36 and 38 are substantially of identical construction and each includes a hub 40 upon which a sprocket 42 is fixedly secured. The two sprockets 42 are mutually interconnected by a drive chain 44. The drive chain 44 and the sprockets 42 preferably have a $\frac{1}{4}$ inch pitch with the sprockets 42 having the same number of teeth, preferably 36. A second sprocket 26 is fixedly secured to the hub 40 of the wheel 38. The sprocket 46 also preferably has a $\frac{1}{4}$ inch pitch with 60 teeth formed thereon.

The rolling surface 48 of each of the wheels 36 and 38 is preferably formed of rubber or a suitable synthetic resinous material. The rolling surface 48 preferably has a rolling circumference of approximately 19 inches and is concave in cross-section to facilitate the rolling of the wheels 36 and 38 along the supporting cable 14 of the cable assembly 12, as best shown in FIGS. 4 and 5.

A reversible hydraulic motor 50 is pivotally secured to the vertical member 24 of the frame 20 as shown at 52. A sprocket 54 is drivingly secured to the power output shaft 56 of the motor 50. The sprocket 54 preferably has a $\frac{1}{4}$ inch pitch with six teeth formed thereon. A drive chain 58 drivingly interconnects the sprocket 54 and the sprocket 46. A threaded bolt 60 is threadedly secured through an internally threaded nut 62 which is fixedly secured to the vertical member 24. The outer end 64 of the bolt 60 abuttingly engages the hydraulic motor 50. It will be seen that rotation of the threaded bolt 60 relative to the nut 62 causes a resulting rotation of the hydraulic motor 50 about the pivot connection 52 thereby permitting the desired tension to be applied to the drive chain 58.

It will be seen from the foregoing that rotation of the output shaft 56 and the hydraulic motor 50, in either direction, will cause a corresponding, synchronized rotation of the wheels 36 and 38 via the drive chains 58 and 44 and the sprockets 54, 46 and 42. A suitable form of hydraulic motor 50 is a positive displacement, sliding vane type motor. Such motors are frequently utilized as drive motors in conventional air impact wrenches.

A single cylinder, two cycle gasoline engine 66 is mounted on the frame 20 adjacent the horizontally extending member 30. An engine suitable for this application has a displacement of 1.9 cubic inches and a maximum power output of 1.5 horsepower. A $\frac{1}{4}$ inch pitch sprocket 68 is drivingly secured to the power output shaft 70 of the engine 66. A gasoline tank 72 is fixedly secured by means of a bracket 74 to the horizontally extending member 32 on the frame 20. A gasoline line 76 is connected at one end 78 thereof to the tank 72 and is connected at the opposite end 80 thereof to the carburetor 82 of the engine 66. A suitable sheet metal shroud 84 extends outwardly over the carburetor 82 to protect it from the entrance of foreign matter during operation of the apparatus 10.

A positive displacement, rotary gear pump 86 is mounted on the frame 20 adjacent the engine 66. A $\frac{1}{4}$-inch pitch sprocket 88 is drivingly secured to the power input shaft 90 of the pump 86. The sprocket 88 and the sprocket 68 on the engine 66 are drivingly interconnected by means of a $\frac{1}{4}$-inch pitch drive chain 92. The pump 86 preferably includes a pressure relief valve 94 mounted integrally in the pump housing. The sprocket 88 preferably includes 48 teeth formed on the periphery thereof while the sprocket 68 of the engine 66 preferably includes 12 teeth formed on the periphery thereof.

A liquid storage tank 96 is mounted on the bottom members 28 and 34 of the frame 20 intermediate the vertical members 22 and 24. The tank 96 is preferably constructed of stainless steel sheet metal to provide protection for the tank against solvent action during cleaning. The tank is approximately 10 inches in length, 11 inches in width and 6 inches in height. The tank provides a nominal storage capacity of approximately 2.5 gallons. An internally threaded aperture 98 is provided in the top panel 100 of the tank 96 to provide access to the interior of the tank to fill the tank with liquid coating material. A filter assembly 102 having external threads 104 formed thereon is threadedly securable within the internally threaded aperture 98, as best shown in FIG. 8. The filter assembly 102 includes a downwardly extending, cylindrically shaped filter member 106 which extends within the confines of the tank 96. The filter member 106 is closed at its bottom end 108 and includes a plurality of filter slits 109 which extend through the cylindrical wall thereof. The upper end portion 110 of the filter assembly 102 is provided with an outwardly extending annular flange 112 which bears against a resilient annular seal 114, formed of an elastomeric or synthetic resinous material, which is disposed about the outer periphery of the filter assembly 102 between the threads 104 and the flange 112. A handle 116, comprising a pair of outwardly extending wings 118 is secured to the upper end portion 110 of the filter assembly 102 by means of three radially outwardly extending spokes 120. The spokes 120 permit the passage of liquid coating material therepast to freely enter the tank 96 through the filter member 106.

A catch pan 122 is disposed above the tank 96 and extends horizontally beyond the vertical members 22 and 24 of the frame 20 at the opposite ends 124 and 126 thereof. The catch pan 122 is preferably formed of stainless steel sheet metal in a funnel-shaped trough configuration with a circular aperture 128 formed in the medial portion thereof at the juncture of the downwardly sloping sides of the catch pan. As shown in FIG. 8, the filter assembly 102 is introduced through the aperture 128 of the catch pan 122 when it is threadedly secured within the internally threaded aperture 98 of the liquid storage tank 96. The annular seal 114 provides sealing engagement between the catch pan 122 adjacent the aperture 128 and the annular flange 112 of the filter assembly 102.

The catch pan 122 is mounted directly to the frame 20 to secure it in position as described above. The catch pan 122 further includes an upwardly extending panel 130, also preferably formed of stainless steel sheet metal, which is secured along the top member 26 and the vertical members 22 and 24 of the frame 20. Synthetic resinous, electrically non-conductive tip extensions 132 and 134 are mounted respectively on the opposite ends 124 and 126 of the catch pan 122. The tip extensions provide a considerable increase in overall length of the catch pan beneath the cable assembly 12, and also provide electrically non-conductive bumper surfaces on the opposite ends of the catch pan.

A four-way hydraulic control valve 136 is mounted on the vertical member 24 of the frame 20. A suitable valve for this application is manufactured by Snap-Tite, Inc. of Union City, Pennsylvania. The valve is designated by Catalog No. P4230HUOD and is a three-position detent valve having an open center. The handle 138 of the valve 136 rotates 45° to each side of the center position, which is that position illustrated in the drawings. Port 140 of the valve 136 is connected by conduit 142 to the output port 144 of the pump 86. Port 146 of the valve 136 is connected to conduit 148. Port 150 of the valve 136 communicates with one port 152 of the reversible hydraulic motor 50 via conduit 154 and flow control valve 156 interposed in conduit 154. Port 158 of the valve 136 communicates with the other port 160 of the reversible hydraulic motor 50 via coduit 162.

Conduit 148 communicates with the liquid storage tank 96 via conduit 164 and by-pass valve 166 interposed therein. Conduit 148 also communicates with a hand-operated spray nozzle 168, having a hand-controlled valve 170 integrally formed therein, via conduit 172 and shut-off valve 174 interposed therein.

Conduit 148 further communicates with a spray nozzle assembly 176 via conduit 178 and shut-off valve 180 interposed therein. The spray nozzle assembly 176 comprises a bifurcated nozzle head 182 formed of tubular material such as stainless steel tubing which is fixedly secured to a bracket 184. The bracket 184 is pivotally secured to an outwardly extending shaft 186 which is fixedly secured to the top member 26 of the frame 20. The bracket 184 can be adjustably clamped to the shaft 186 by means of an internally threaded wing nut 188 which is threadedly secured to the externally threaded outer end of the shaft 186. This construction permits the nozzle head 182 of the spray nozzle assembly 176 to be vertically adjusted relative to the frame 20 so that the liquid streams emanating from the tips of the bifurcated nozzle head 182 properly impinge on the surface of the coaxial cable 16 of the cable assembly 12. This feature is most advantageous when the apparatus 10 is to be alternately used on cable assemblies wherein the coaxial cable 16 is supported a distance below the supporting cable 14, and, in those situations where the coaxial cable 16 is secured directly to the support cable 14 by spiral wire interconnection as illustrated in the drawings at 18.

It will also be noted that a hook 190 is preferably secured to the top member 26 of the frame 20 upon which the conduit 172 and hand operated spray nozzle 168 can be conveniently supported when not in use. The inlet port 192 of the gear pump 86 communicates with the liquid storage tank 96 via conduit 194.

A cable wiping assembly 196 is mounted on the apparatus 10 within the catch pan 122. The assembly 196 includes a lower member 198 which is pivotally secured at its lower end to a bracket 200 mounted on the upper surface of the catch pan 122 adjacent the aperture 128. The lower member 198 can be rigidly secured to the bracket 200 in a predetermined position by means of a threaded bolt and wing nut 202 interconnecting the lower member 198 and the bracket 200. A cylindrically shaped ferrule 204 is mounted on the upper end of the lower member 198 via a coaxially aligned coil spring 206. The coil spring 206 permits the ferrule 204 to be deflected from longitudinal alignment with the lower member 198 when the ferrule 204 is acted upon by a lateral force of predetermined magnitude. A brush 208 is carried by the ferrule 204 with the cylindrical handle 210 of the brush received within the ferrule 204. The bristles 212 of the brush contact the lower portion of the coaxial cable 16 when the apparatus is properly adjusted for use. By properly positioning the lower member 198 relative to the bracket 200, the bolt and wing nut 202 can be mutually secured in such a manner as to provide a predetermined magnitude of force between the bristles 212 and the cable 16 through the bias of the coil spring 206.

It will be understood that the cable wiping assembly 196 is in position in FIG. 1 to wipe the cable 16 when the apparatus 10 traverses the cable assembly 12 from right to left as viewed therein. When the apparatus is to move from left to right as viewed in FIG. 1, the cable wiping assembly 196 will be swung to the left about the bracket 200 and the bristles 212 of the brush 208 will be adjusted to contact the cable 16 at a point to the left of the wheel 38.

The apparatus 10 further preferably includes a lifting eye or handle 214 which is fixedly secured to the top member 26 of the frame 20 intermediate the vertical members 22 and 24. In this position, the lifting eye 214 can be used to support the apparatus 10 when it is being installed on and removed from a cable assembly 12 or when it is being transported to and from the work site.

OPERATION

When it is desired to apply a liquid coating material to the exterior of an insulated coaxial cable with the apparatus 10, the apparatus is first transported to the site where the cable is located and the gasoline tank 72 is filled with the appropriate fuel for the engine 66. The liquid storage tank 96 is filled with a suitable liquid coating agent. One such liquid coating agent suitable for coating insulated telephone cable, is manufactured and sold by Winton Products Co., Inc. of Charlotte, North Carolina and is sold under the trademark "INSA-LITE". This product remains in liquid form until exposed to the air at which time the product proceeds to harden to provide a suitable water-resistant seal on the surface of the cable.

It will be seen from the foregoing description of the structure of the apparatus 10 that the same liquid employed to coat the cable is also employed in the apparatus 10 to drive the apparatus 10 along the cable via the reversible hydraulic motor 50 and its chain and sprocket interconnection with the wheels 36 and 38. As mentioned, as long as the "Insalite" is not exposed to the air for any extended period, it remains in liquid form and is quite suitable for this dual function. It is readily apparent that the utilization of the "Insalite" in this dual capacity simplifies the construction and maintenance of the apparatus 10 and minimizes the weight of the apparatus which must be supported by the supporting cable 14.

The apparatus 10 is then lifted by suitable means and the wheels 36 and 38 are positioned over the supporting cable 14 as illustrated in the drawings. Since the apparatus 10 weighs approximately 54 pounds dry, such hoisting may be accomplished manually or through the employment of a mechanical lifting device such as a light boom truck or the like.

The engine 76 is then started which, in turn, drives the pump 86 to circulate the liquid through the system. When it is desired to employ the apparatus 10 to manually spray the "Insalite" liquid on the cable, such as in those areas immediately adjacent the cable supporting poles, the valve 180 is shut off and the control valve 136 is positioned in its neutral or center position as shown in FIG. 6. Valve 174 is opened and valve 166 is suitably adjusted to provide the desired pressure at the valve 170 and the nozzle 168. The operator then employs the hand operated spray nozzle 168 to spray the "Insalite" on the cable while controlling the spray with the hand operated valve 170. When this spraying operation is completed, the valve 174 can be shut off to release the pressure on the conduit 172 and the valve 170. This conduit 172 can then be coiled and stored on the hook 190 of the apparatus 10 as illustrated in FIG. 3.

When it is now desired to cause the apparatus 10 to automatically dispense the "Insalite" liquid on the cable 16, the cable wiping assembly 196 is positioned as shown in the drawings and described above, the valve 180 is opened and the control valve 136 is positioned such that pressurized liquid is applied therethrough through the open valve 156 and the conduit 154 to the port 152 of the reversible hydraulic motor 50. The apparatus 10 will then move along the cable assembly 12 in a direction from right to left as viewed in FIG. 1. The forward speed of the apparatus 10 is adjusted by manipulation of the flow control valve 156. The spray pressure at the spray nozzle assembly 176 is adjusted by manipulation of the by-pass valve 166.

As the apparatus 10 traverses the cable assembly 12 under its own power, the liquid coating material is uniformly dispensed on the upper surface of the coaxial cable 16 of the cable assembly 12 by the spray nozzle 176, and excess liquid coating material is distributed on the lower surface of the coaxial cable 16 by the trailing bristles 212 of the brush 208. Excess liquid coating material from the spray nozzle assembly 176 or dripping from the cable assembly 12 falls downwardly into the catch pan 122 and is directed thereby along its sloping sides to and through the filter assembly 102 in the apertures 128 and 98 and into the liquid storage tank 96 through the filter member 106 for recirculation through the system. This latter feature of the apparatus 10 maximizes the efficiency of utilization of the liquid coating material while minimizing the possible adverse effects of spattering the liquid coating material on objects not intended to be coated.

If it is desired to cause the apparatus 10 to move along the cable assembly 12 in a direction from left to right as viewed in FIG. 1, the cable wiping assembly 196 need only be swung to the left as viewed in FIG. 1, and adjusted as described above, and the control valve 136 adjusted to apply pressurized liquid coating material to the port 160 of the reversible hydraulic motor 50 via conduit 162.

The apparatus 10 can be conveniently stopped or reversed at any point along its traverse of a length of cable assembly 12 by engagement and manipulation of the control handle 138 of the hydraulic control valve 136 from the ground by means of a conventional utility stick as used in both the telephone and electric utility industries.

The apparatus 10 provides important advantages in the treating of telephone cables and the like which have been clearly lacking in the past. The apparatus 10 is eminently suited for treating cable assemblies which pass over dense underbrush, water or rough terrain which would otherwise prevent the application of the liquid coating material to the cable by personnel on the ground. Further, employment of the catch pan 122 and panel 130 minimizes the undesirable effects of overspraying of the liquid coating material onto trees and structures adjacent the cable assembly being treated.

At the end of a work day, the apparatus 10 can be conveniently cleaned and made ready for the next day's work by flushing the liquid coating material adhered thereto from the exterior of the apparatus by means of a suitable solvent. This solvent can also be circulated through the hydraulic system by the pump 86 to clean the interior thereof.

It will be readily apparent to those skilled in the art of applying liquid coating material to coaxial telephone cables or the like to improve or maintain their water resistance capabilities that the apparatus of the present invention provides clear and distinct advantages over the methods and apparatus currently in use which require the manual application of the liquid coating material to the cable by means of a spray head manipulated by an operator from the ground and supplied with pressurized liquid coating material from a pump or pressurized container on the ground which must be moved along beneath the cable.

Changes may be made in the construction, combination and arrangement of parts or elements as heretofore set forth in the specification and shown in the drawings without departing from the spirit and scope of the invention as defined in the following claims.

What is claimed is:

1. Apparatus for dispensing a coating of liquid on a telephone cable or the like supported above the ground, comprising:
   a frame;
   support means carried on said frame for supporting said apparatus on a cable for movement of said apparatus therealong;
   liquid supply means carried by said frame for providing a quantity of liquid under elevated pressure;
   nozzle means carried by said frame and communicating with said liquid supply means for receiving liquid therefrom and directing liquid onto a cable;
   hydraulic motor drive means carried by said frame and operatively connected to said support means for propelling said apparatus along the cable upon which it is supported;
   conduit means for connecting said hydraulic motor to said liquid supply means for conducting liquid between said hydraulic motor and said liquid supply means to drive said hydraulic motor; and means drivingly connecting said hydraulic motor to said support means for transmitting power from said hydraulic motor to said support means thereby to propel said apparatus.

2. The apparatus as defined in claim 1 wherein said nozzle means is characterized further to include:
 a plurality of nozzles, each of said nozzles being oriented to direct liquid therefrom onto a cable.

3. The apparatus as defined in claim 2 characterized further to include:
 means carried by said frame for removing excess liquid from the cable.

4. Apparatus for applying a coating of liquid on a telephone cable or the like supported above the ground, comprising:
 a frame;
 wheel means journaled on said frame for supporting said apparatus on a cable for movement of said apparatus therealong;
 pump means carried on said frame for pumping liquid therethrough;
 pump drive means operatively connected to said pump means for driving said pump means;
 means operatively connected to said pump means for providing liquid to said pump means to be pumped therethrough;
 nozzle means carried on said frame for directing liquid therethrough onto a cable;
 means operatively connecting said pump means and said nozzle means for conducting liquid pumped from said pump means to said nozzle means;
 a hydraulic drive motor;
 means for drivingly connecting said hydraulic drive motor to said wheel means to move said apparatus along the cable upon which it is supported; and
 conduit means operatively connecting said hydraulic drive motor and said pump means for conducting liquid pumped from said pump means to said hydraulic drive motor.

5. The apparatus as defined in claim 4 characterized further to include:
 means carried by said frame for removing excess liquid from the cable upon which such liquid has been directed by said nozzle means.

6. The apparatus as defined in claim 4 characterized further to include:
 control means operatively connected to said wheel drive means for causing said wheel drive means to drive said wheel means in one direction to move said apparatus in a corresponding direction along the cable upon which it is supported and, alternately, for causing said wheel drive means to drive said wheel means in a second direction to move said apparatus in a corresponding opposite direction along the cable.

7. The apparatus as defined in claim 4 characterized further to include:
 means carried by said frame for catching excess liquid from said nozzle means and returning such excess liquid to said means for providing liquid to said pump means for reuse.

8. The apparatus as defined in claim 7 wherein said means for catching excess liquid from said nozzle means is characterized further to include:
 filter means for filtering said excess liquid prior to the reuse thereof.

9. The apparatus as defined in claim 4 wherein said means operatively connecting said pump means and said nozzle means is characterized further to include:
 valve means interposed between said pump means and said nozzle means for controlling the flow of liquid through said nozzle means.

10. The apparatus as defined in claim 4 wherein said conduit means operatively connecting said hydraulic drive motor and said pump means is characterized further to include:
 control valve means interposed between said pump means and said hydraulic drive motor for controlling the flow of liquid to said hydraulic drive motor and causing said hydraulic drive motor to drive said wheel means in one direction to move said apparatus in a corresponding direction along the cable upon which it is supported and, alternately, causing said hydraulic drive motor to drive said wheel means in a second direction to move said apparatus in a corresponding opposite direction along the cable.

11. The apparatus as defined in claim 4 wherein said pump drive means is characterized further to include:
 a pump drive motor carried on said frame and having a power output shaft;
 a power input shaft mounted on said pump means; and
 means for drivingly interconnecting the power output shaft of said pump drive motor and the power input shaft of said pump means.

12. The apparatus as defined in claim 11 wherein said pump drive motor is characterized further to include:
 an internal combustion engine carried on said frame;
 a fuel tank carried on said frame; and
 a conduit interconnecting said fuel tank and said internal combustion engine.

13. The apparatus as defined in claim 11 wherein said means for drivingly interconnecting the power output shaft of said pump drive motor and the power input shaft of said pump means is characterized further to include:
 a drive sprocket secured to the power output shaft of said pump drive motor;
 a driven sprocket secured to the power input shaft of said power pump means; and
 an endless drive chain mutually drivingly engaging said drive sprocket and said driven sprocket.

14. Apparatus for applying liquid coating material to telephone cables or the like comprising:
 a rigid frame having an upper portion, a lower portion, a first end and a second end;
 first and second wheel means journaled respectively on the upper portion of said frame adjacent the first and second ends thereof for supporting said apparatus on a cable for movement of said apparatus therealong;
 reservoir means carried on the lower portion of said frame for containing a quantity of liquid coating material therein;
 a pump carried on the lower portion of said frame, said pump having an inlet port and an outlet port;
 conduit means for conducting liquid coating material from said reservoir means to the inlet port of said pump;
 a control valve carried on said frame and having an inlet port, a return port, a first motor port and a second motor port;

conduit means for conducting liquid coating material from the outlet port of said pump to the inlet port of said control valve;

a hydraulic drive motor carried on said frame, said hydraulic drive motor having a forward port and a reverse port;

drive means operatively connecting said hydraulic drive motor and said first and second wheel means for driving said wheel means in response to said hydraulic drive motor;

conduit means for conducting liquid coating material between the first motor port of said control valve and the forward port of said hydraulic drive motor;

conduit means for conducting liquid coating material between the second motor port of said control valve and the reverse port of said hydraulic drive motor;

nozzle means carried on said frame for directing liquid coating material onto said cable;

conduit means for conducting liquid coating material between the return port of said control valve and said nozzle means;

primary drive motor means carried by said frame for providing power to said pump; and means operatively connecting said primary drive motor means and said pump for transmitting power from said primary drive motor means to said pump.

15. The apparatus as defined in claim 14 wherein:

said first wheel means comprises a first circular wheel journaled on the upper portion of said frame adjacent the first end thereof and having a circumferential recess formed thereon sized and shaped to engage the cable upon which said apparatus in supported for movement therealong; and said second wheel means comprises a second circular wheel journaled on the upper portion of said frame adjacent the second end thereof and having a circumferential recess formed thereon sized and shaped to engage the cable upon which said apparatus is supported for movement therealong.

16. The apparatus as defined in claim 15 wherein said control valve is characterized further to include:

control lever means responsive to operating forces external thereto for positioning said control valve in a first forward position communicating the inlet port with the first motor port and communicating the second motor port with the return port, and, alternately for positioning said control valve in a reverse position communicating the inlet port with the second motor port and communicating the first motor port with the return port.

17. The apparatus as defined in claim 15 wherin said control valve is characterized further to include:

control lever means responsive to operating forces external thereto for alternately positioning said control valve in a plurality of positions comprising:

a forward position communicating the inlet port with the first motor port and communicating the second motor port with the return port;

a neutral position communicating the inlet port with the return port and blocking the first and second motor ports; and a reverse position communicating the inlet port with the second motor port and communicating the first motor port with the return port.

18. The apparatus as defined in claim 14 wherein said hydraulic drive motor is characterized further as being a sliding vane rotary motor.

* * * * *